(12) United States Patent
Singh et al.

(10) Patent No.: US 7,936,153 B2
(45) Date of Patent: May 3, 2011

(54) ON-CHIP ADAPTIVE VOLTAGE COMPENSATION

(75) Inventors: Deepak K. Singh, Apex, NC (US); Francois Ibrahim Atallah, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 11/671,485

(22) Filed: Feb. 6, 2007

(65) Prior Publication Data
US 2008/0186001 A1     Aug. 7, 2008

(51) Int. Cl.
*G06F 1/26* (2006.01)
*G06F 1/32* (2006.01)

(52) U.S. Cl. ........ 323/234; 713/300; 713/320; 713/322; 713/330; 327/158; 327/512; 327/513

(58) Field of Classification Search ............ 713/300, 713/320, 330, 322; 327/158, 512, 513
See application file for complete search history.

(56) References Cited

U.S. PATENT DOCUMENTS

| | | | | |
|---|---|---|---|---|
| 4,417,470 A | 11/1983 | McCracken et al. | ......... | 374/136 |
| 5,375,146 A | 12/1994 | Chalmers | ..................... | 375/350 |
| 5,451,894 A | 9/1995 | Guo | ............... | 327/241 |
| 5,457,719 A | 10/1995 | Guo et al. | ..................... | 375/373 |
| 5,737,342 A | 4/1998 | Ziperovich | ................... | 371/25.1 |
| 5,844,826 A | 12/1998 | Nguyen | .................... | 364/715.1 |
| 5,852,616 A | 12/1998 | Kubinec | ..................... | 371/21.1 |
| 5,990,725 A | 11/1999 | LoCascio | | |
| 6,037,732 A | 3/2000 | Alfano et al. | | |
| 6,047,248 A * | 4/2000 | Georgiou et al. | ............ | 702/132 |
| 6,058,502 A | 5/2000 | Sakaguchi | ..................... | 714/811 |
| 6,070,074 A | 5/2000 | Perahia et al. | ................ | 455/430 |
| 6,076,157 A | 6/2000 | Borkenhagen et al. | ....... | 712/228 |
| 6,111,414 A | 8/2000 | Chatterjee et al. | ............ | 324/633 |
| 6,125,334 A * | 9/2000 | Hurd | ............................... | 702/60 |
| 6,141,762 A | 10/2000 | Nicol et al. | ................... | 713/300 |
| 6,172,611 B1 | 1/2001 | Hussain et al. | | |
| 6,212,544 B1 | 4/2001 | Borkenhagen et al. | ....... | 709/103 |
| 6,351,601 B1 | 2/2002 | Judkins, III | | |

(Continued)

FOREIGN PATENT DOCUMENTS

CN             1716161         1/2006

(Continued)

OTHER PUBLICATIONS

Gupta and Rincon-Mora, "Predicting the Effects of Error Sources in Bandgap Reference Circuits and Evaluating Their Design Implications" IEEE's Midwest Symposium on Circuits and Systems (MWSCAS), vol. 3, pp. 575-578, Tulsa, Oklahoma, 2002.

(Continued)

*Primary Examiner* — Thomas Lee
*Assistant Examiner* — Michael J Brown
(74) *Attorney, Agent, or Firm* — Ian D. MacKinnon; Thomas E. Tyson (57) ABSTRACT

Measurement circuit components are included in an integrated circuit fabricated on a semiconductor substrate. These measurement circuits are connected to a voltage regulation circuit that provides the integrated circuit voltage source. These measurement circuits provide signals to control the voltage regulation circuit to adjust the voltage output to the integrated circuit based upon a measurement values obtained on the semiconductor device. These measurements include temperature and IR drop at locations on the semiconductor substrate, along with the frequency response of integrated circuit.

9 Claims, 5 Drawing Sheets

U.S. PATENT DOCUMENTS

| | | |
|---|---|---|
| 6,429,796 B1 | 8/2002 | Buckley |
| 6,481,974 B2 | 11/2002 | Horng et al. |
| 6,591,210 B1 | 7/2003 | Lorenz |
| 6,625,635 B1 | 9/2003 | Elnozahy ...................... 709/102 |
| 6,713,996 B2* | 3/2004 | Di Iorio ........................ 323/313 |
| 6,721,581 B1 | 4/2004 | Subramanian |
| 6,721,892 B1 | 4/2004 | Osborn |
| 6,724,214 B2 | 4/2004 | Manna et al. |
| 6,838,917 B2 | 1/2005 | Brass et al. |
| 6,859,113 B2 | 2/2005 | Giousouf |
| 6,897,673 B2 | 5/2005 | Savage et al. ................. 324/765 |
| 7,086,058 B2 | 8/2006 | Luick |
| 7,093,109 B1 | 8/2006 | Davis et al. ................... 712/228 |
| 7,096,140 B2 | 8/2006 | Nozuyama et al. ........... 702/117 |
| 7,100,061 B2 | 8/2006 | Halepete et al. .............. 713/322 |
| 7,174,194 B2 | 2/2007 | Chauvel et al. ............... 455/574 |
| 7,184,936 B1 | 2/2007 | Bhandari ...................... 702/189 |
| 7,211,977 B2 | 5/2007 | Squibb |
| 7,228,446 B2 | 6/2007 | Jorgenson et al. ............ 713/300 |
| 7,282,966 B2 | 10/2007 | Narendra et al. ............... 327/99 |
| 7,307,439 B2 | 12/2007 | Takamiya et al. ............. 324/763 |
| 7,321,254 B2* | 1/2008 | Li et al. ......................... 327/534 |
| 7,330,081 B1 | 2/2008 | Asa et al. ........................ 331/57 |
| 7,330,983 B2 | 2/2008 | Chaparro |
| 7,429,129 B2 | 9/2008 | St. Pierre |
| 7,437,581 B2 | 10/2008 | Grochowski et al. |
| 7,734,939 B2 | 6/2010 | Kolinummi |
| 2002/0046399 A1 | 4/2002 | Debling ......................... 717/138 |
| 2002/0065049 A1 | 5/2002 | Chauvel et al. ................. 455/66 |
| 2003/0030483 A1* | 2/2003 | Seki et al. ...................... 327/540 |
| 2003/0057986 A1 | 3/2003 | Amick et al. ................. 324/760 |
| 2003/0067334 A1 | 4/2003 | Brass et al. |
| 2003/0079150 A1 | 4/2003 | Smith et al. |
| 2003/0126476 A1* | 7/2003 | Greene et al. ................. 713/300 |
| 2003/0184399 A1 | 10/2003 | Lanoue et al. ................ 331/176 |
| 2004/0023688 A1 | 2/2004 | Bazarjani et al. ............. 455/557 |
| 2004/0025061 A1* | 2/2004 | Lawrence ..................... 713/300 |
| 2004/0090216 A1* | 5/2004 | Carballo et al. .............. 323/234 |
| 2004/0183613 A1 | 9/2004 | Kurd et al. ..................... 331/186 |
| 2004/0268280 A1 | 12/2004 | Eleyan et al. ..................... 716/6 |
| 2005/0114056 A1 | 5/2005 | Patel |
| 2005/0116733 A1 | 6/2005 | Barr et al. ..................... 324/763 |
| 2005/0134394 A1 | 6/2005 | Liu |
| 2005/0174102 A1 | 8/2005 | Saraswat et al. .............. 324/102 |
| 2005/0209740 A1 | 9/2005 | Vann, Jr. |
| 2005/0273290 A1 | 12/2005 | Asano et al. |
| 2005/0278520 A1 | 12/2005 | Hirai et al. ......................... 713/1 |
| 2005/0289367 A1 | 12/2005 | Clark et al. ................... 713/300 |
| 2006/0066376 A1 | 3/2006 | Narendra |
| 2006/0149974 A1* | 7/2006 | Rotem et al. .................. 713/300 |
| 2006/0197697 A1 | 9/2006 | Nagata ............................ 342/22 |
| 2006/0247873 A1 | 11/2006 | Fung et al. ...................... 702/64 |
| 2007/0006007 A1* | 1/2007 | Woodbridge et al. ......... 713/322 |
| 2007/0074216 A1 | 3/2007 | Adachi et al. ................. 718/102 |
| 2007/0192650 A1 | 8/2007 | Shiota .......................... 713/600 |
| 2007/0260895 A1 | 11/2007 | Aguilar et al. ................ 713/300 |
| 2008/0004755 A1 | 1/2008 | Dunstan et al. |
| 2008/0071493 A1 | 3/2008 | Wang |
| 2008/0136400 A1* | 6/2008 | Chi et al. ...................... 323/318 |

FOREIGN PATENT DOCUMENTS

WO  WO 2006/072106 A2  6/2006

OTHER PUBLICATIONS http://en.wikipedia.org/wiki/Bandgap_voltage_reference.
PCT International Search Report, mailed Feb. 5, 2008, for PCT application EP2008/050919, 3 pages.*
Schweber, A/D and D/A Converters: Critical links that just keep getting better, Apr. 1989, 4 pages.
PCT International Search Report, mailed Jun. 16, 2008, for PCT application EP2008/050922, 4 pages.
Moore, B.D.; "Tradeoffs in Selecting IC Temperature Sensors"; 1999; Elsevier Science; pp. 181-184.
McGowen, "Adaptive Designs for Power and Thermal Optimization," Nov. 2005, pp. 118-121.

* cited by examiner

ON-CHIP ADAPTIVE VOLTAGE COMPENSATION

RELATED APPLICATIONS

This application is related to the following co-pending U.S. Patent Applications filed on the same day as the present application and having the same assignee: "Using Temperature Data for Instruction Thread Direction," (U.S. patent application Ser. No. 11/671,640); "Using Performance Data for Instruction Thread Direction," (U.S. patent application Ser. No. 11/671,627); "Using IR Drop Data for Instruction Thread Direction," (U.S. patent application Ser. No. 11/671,613); "Integrated Circuit Failure Prediction," (U.S. patent application Ser. No. 11/671,599); "Instruction Dependent Dynamic Voltage Compensation," (U.S. patent application Ser. No. 11/671,579); "Temperature Dependent Voltage Source Compensation," (U.S. patent application Ser. No. 11/671,568); "Fan Speed Control from Adaptive Voltage Supply," (U.S. patent application Ser. No. 11/671,555); and "Digital Adaptive Voltage Supply," (U.S. patent application Ser. No. 11/671,531); each assigned to the IBM Corporation and herein incorporated by reference.

BACKGROUND OF THE INVENTION

1. Technical Field

The present invention relates in general to a system and method for regulating voltage to an integrated circuit contained on a semiconductor substrate. In particular, the present invention relates to a system and method for regulating voltage to an integrated circuit in response to measured physical conditions of the integrated circuit itself.

2. Description of the Related Art

The performance of integrated circuits varies during the manufacturing process. Traditionally, these integrated circuits, which are manufactured on semiconductor substrate wafers, are tested and graded upon manufacture completion to determine their performance. Upon being graded, the semiconductor substrates are packaged and sold based on this measure performance. This grading details predicted performance for a specified single voltage to be provided to the integrated circuit for all operating conditions.

The integrated circuit that marginally fails to meet the performance criteria is typically discarded, even though it is fully functional without any defect. This results in yield loss. One way to marginally increase the performance of an integrated circuit is to increase the nominal operating voltage applied to it. So to ensure minimum yield loss due to under-performing integrated circuit samples, they are packaged with a higher than nominal voltage specification marked on the package itself. However, this test for performance is done at a single operating point, i.e. at a fixed temperature and given process, a measurement is made to find out what is the voltage required to attain the minimum performance criteria. In a system though, the temperature and voltages are not constant, so to guard against these variations, a voltage even higher than that needed to achieve minimum performance criteria is actually stamped on the package as the nominal voltage.

Also, calibration of individual integrated samples takes up more test time that increases cost. In such a static test method, since the power supply voltage is set at wafer based on single operating point, the opportunity to reduce power dynamically is lost.

Therefore, there is no provision made for responding to changing operating system conditions of the integrated circuit after it has been graded and packaged.

SUMMARY

In accordance with the present invention, a method for regulating voltage supplied to a circuit is provided that includes the steps of measuring temperature on the circuit; measuring a voltage drop in the circuit; and measuring a frequency response of the circuit and adjusting the voltage supplied to the circuit based on these measurements.

In one embodiment of the present invention, measurement circuit components are included in integrated circuit fabricated on a semiconductor substrate. These measurement circuits are connected to a voltage regulation circuit providing power to the integrated circuit. These measurement circuits provide signals to control the voltage regulation circuit which adjusts the voltage output to the integrated circuit based upon a measurement values obtained on the semiconductor device. These measurements include temperature and IR drop at locations on the semiconductor substrate, along with the frequency response of integrated circuit.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

The present invention provides a system to measure operating conditions on an integrated circuit and adjust voltage (Vdd) provided to the integrated circuit to either increase performance of the integrated circuit or save power expended by the integrated circuit.

In the preferred embodiment, three physical condition measurements are made. The first is temperature, which is measured by a thermal diode on the surface of the integrated circuit. The second is the IR (voltage) drop measured by two ring oscillator circuits and the third is the frequency performance of the integrated circuit measured by a single loop oscillator compared to stored predetermined performance values.

The complete control signal provided to the voltage regulation circuit is:

Total Vdd scaling=Frequency response scaling+Temperature related Vdd scaling+IR drop related scaling All of the measurement circuits are contained on the surface of this integrated circuit device in the preferred embodiment. These measurements are then used to scale an input control signal to a voltage regulation circuit also contained on the surface of the integrated circuit device or alternatively on another integrated circuit. The output of this voltage regulation device provides the integrated circuit operating voltage (Vdd). Thus the voltage supplied to the integrated circuit can be adjusted to either save power or increase performance dynamically during the operation of the chip by under program control. Further the integrated circuit voltage and, therefore, performance can be changed in anticipation of operating environment changes such as a sleep state or the execution of instructions requiring high circuit performance.

This is a dynamic method of varying voltage that takes into account the specifics of the semiconductor manufacturing process, temperature and IR drop effects simultaneously. This method uses available on-chip data to compute adjustment in voltage necessary to either meet target performance or decrease power consumption. The two goals are met using the same circuit. Another advantage of using this method is the flexibility it offers to the users in terms of programmability. On chip voltage can be artificially varied by writing into special registers which provide values used by the power management circuitry to provide the supply voltage Vdd. This feature can be helpful when expecting instructions that require high circuit performance, essentially providing an "on-Demand" performance capability. In other words, to provide on request, additional circuit supply voltage to increase circuit performance.

This method is not limited to a specific technology or type of circuit. It can be applied to a broad type of integrated circuits, especially those that need to deliver higher performance at lower power consumption.

This method also offers reduction in test time for identifying yield and voltage per module. It is a dynamic solution unlike previous static solutions (fuses, etc) that takes into account effects of IR drop.

Figure 1:
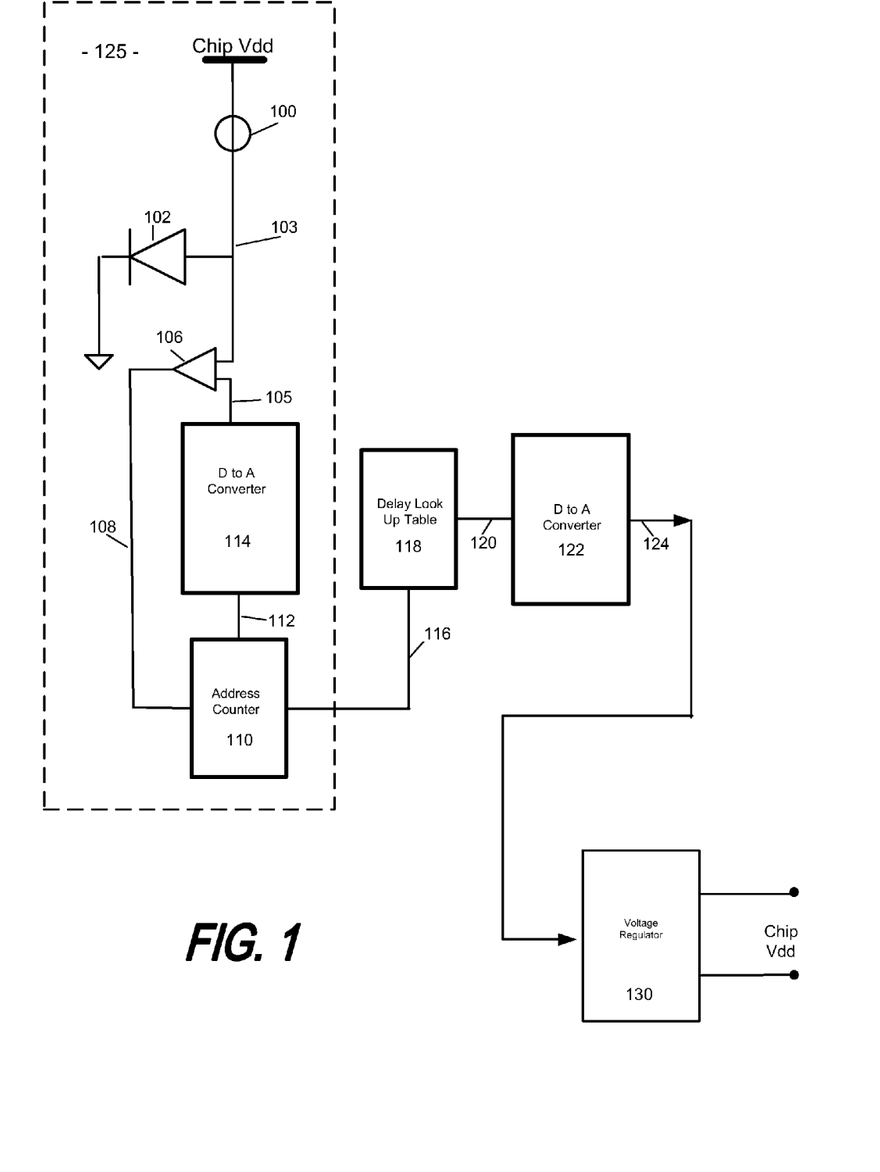
FIG. 1 is a schematic diagram of a simple embodiment of the temperature measurement circuit.

FIG. 1 is a schematic diagram of one embodiment of the thermal measurement circuit 125 shown connected to the voltage regulation circuit which provides the integrated circuit voltage source (Chip Vdd). This measurement circuit includes a current source 100 connected to the voltage source. This current source 100 is also connected by a line 103 to a thermal diode 102 also connected to ground. The voltage across the thermal diode 102 indicates the measured temperature of this integrated circuit. This thermal voltage signal is provided over line 103 to an analog comparator 106. The output of the comparator 106 is connected to an address counter 110 providing an address to a digital to analog (D to A) converter 114. The operating range for a thermal diode is commonly zero to 125° C. The address counter 110 includes a look up table with 128 entries. These entries correspond to 0 to 127 degrees C. Initially, the address counter 110 starts at zero degrees and increments upward each clock cycle. Each address is provided to the D to A converter 114 over line 112. In operation, the analog comparator 106 compares the output of the D to A converter 114 with the measured thermal voltage provided by the thermal diode 102. When the address counter 110 provides an output representing the same temperature as the thermal diode 102, the output voltage from the D to A converter 110 will be the same voltage as that provided by the thermal diode 102. The output of the analog comparator 106 will then be zero. The address counter 110 will then stop incrementing and provide a signal over line 116 to a delay lookup table (LUT) circuit 118. This value on line 116 is a digital signal representing the temperature measured by the thermal diode 102. This thermal voltage value is used to address a corresponding delay value in the delay lookup table circuit 118. The delay lookup table in circuit 118 is a table of pulse width values computed by a simulation of the performance of the integrated circuit. Each value represents the expected delay value computed for the temperature range of 0 to 127 degrees C. for expected integrated circuit performance.

To measure the process on the substrate, a ring oscillator connected to a temperature compensated voltage source (ex: a bandgap reference) is used. In this case, for a given temperature, the pulse width produced by the ring oscillator is a function of the process on the substrate since temperature and voltage are constant. By using a bandgap reference, the voltage applied to a ring oscillator can be kept constant. But the temperature of the substrate depends upon internal and external operating conditions and it cannot be held constant. To eliminate the effects of varying temperature, another scheme is used in this invention.

First, a target predicted circuit performance number (pcpn) is chosen. This number represents the expected circuit performance based on expected semiconductor manufacturing process. This number represents circuit performances expected under nominal applied voltage across the entire operating temperature range. For this pcpn, a simulation of the ring oscillator supplied by a constant voltage from a bandgap reference is carried out for the entire operating temperature range. This simulation yields pulse widths that are generated at a fixed voltage and pcpn values where only the temperature is varied across the entire operating temperature range. If the substrate pcpn is identical to the desired target performance, then the substrate would also yield identical pulse widths for each value of the operating temperature range.

If the substrate pcpn is different than the desired target performance, then the pulse widths produced by the substrate will be either shorter or longer than those produced by simulation depending upon whether the substrate pcpn was faster or slower than the desired target performance. So a comparison has to be made between the pulse width generated by the ring oscillator on the substrate with a simulated value of the pulse width at the value of the substrate temperature at a fixed voltage. The expected pulse width values at the desired target process for each temperature value within the desired operating temperature range are stored in a Look Up Table (LUT) (for example, 118 in FIG. 1) that is addressed by the current substrate temperature, i.e. based on the substrate temperature, the address pointer points to an entry in the LUT that contains the expected pulse width from the ring oscillator circuit at the desired process corner at a fixed bandgap voltage. For this invention, the operating temperature range is 0° C. to 127° C. and this range is divided into 128 steps of 1° C. each. This requires 128 entries in the LUT, one entry corresponding to each 1° C. rise in temperature.

This resulting pulse width value from the delay lookup table circuit 118 provides a voltage scaling signal in digital form which is converted to an analog voltage signal by D to A converter 122. This scaling voltage signal is provided to a voltage regulator 130 over line 124. The operation result of the circuit 125 would be to increase or decrease the resulting voltage of regulator circuit 130 (chip Vdd) based upon the measured temperature of the integrated circuit measured by thermal diode 102.

Figure 2:
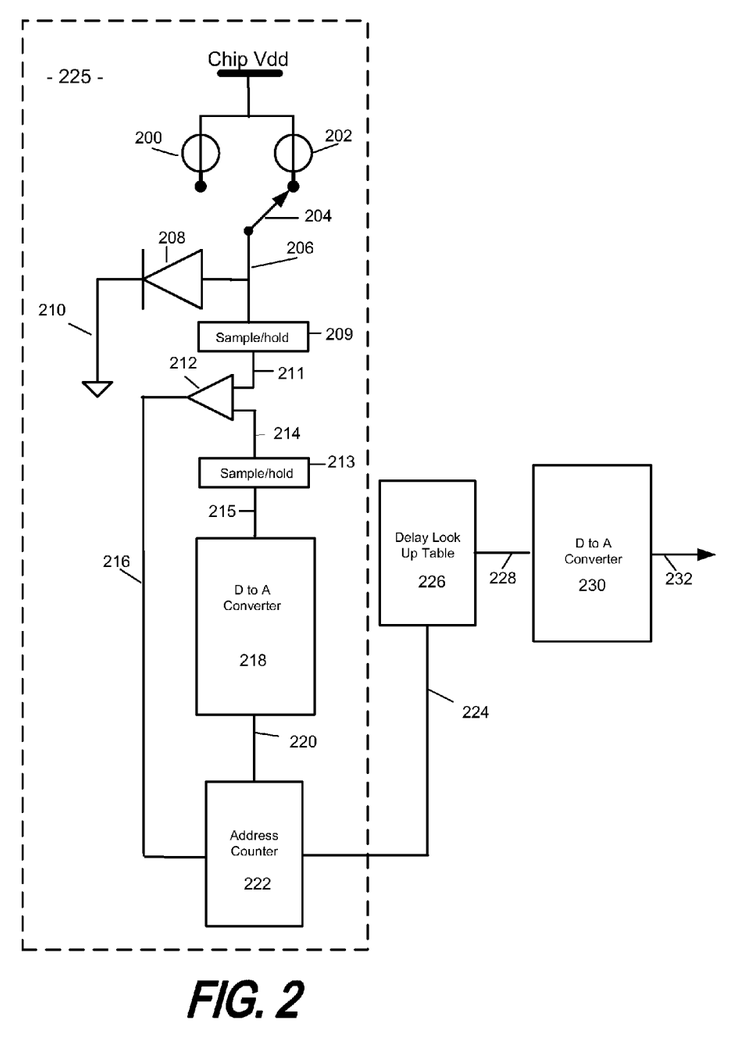
FIG. 2 is a schematic diagram of a second embodiment of the temperature measurement circuit.

FIG. 2 is a second embodiment of the thermal measurement circuit illustrated in FIG. 1. The temperature measurement circuit 225 of FIG. 2 includes two current sources 200 and 202 which are selectively connected to a thermal diode 208 through a switch 204 connected by line 206. The diode is actually made up of a lateral PNP device fabricated in CMOS technology. The collector and base of this device are shorted leaving the diode between base and emitter.

Digital temperature sensors are based on the principle that the base-emitter voltage, $V_{BE}$, of a diode-connected transistor is inversely proportional to its temperature. When operated over temperature, $V_{BE}$ exhibits a negative temperature coefficient of approximately −2 mV/° C. In practice, the absolute value of $V_{BE}$ varies from transistor to transistor. To nullify this variation, the circuit would have to calibrate each individual transistor. A common solution to this problem is to compare the change in $V_{BE}$ of the transistor when two different current values are applied to the emitter of the transistor.

Temperature measurements are made using a diode that is fed by 2 current sources, one at a time. Typically the ratio of these current sources is 10:1. The temperature measurement requires measuring the difference in voltage across the diode produced by applying two current sources.

Line 206 is connected to a "sample and hold" circuit 209 to sample and hold a voltage output of the thermal diode 208. The address counter circuit 222 operates identically to the address counter, circuit 110 of FIG. 1 previously discussed. Address counter circuit 222 increments an address every clock cycle which provides a digital signal representing the temperature range of zero to 127° C. over line 220 to the D to A converter 218 which converts this digital signal representing temperature to a voltage. This voltage signal is provided on line 215 to a second sample and hold circuit 213. Both the sample of the hold circuits 209 and 213 will sample and hold their respective voltages for the comparator 212 so that continuing small variations in temperature from the thermal diode 208 will not adversely affect the operation of this temperature measurement circuit 225. Upon reaching the measured temperature, the comparator 212 will provide a zero output over line 216 to the address counter 222 which provides a digital signal representing the measured temperature on line 224 to the delay lookup table circuit 226. The operation of the delay lookup table circuit 226 providing a digital delay value on line 228 to the D to A converter 230 is the same as previously discussed for the measurement circuitry 125 in FIG. 1.

Figure 3:
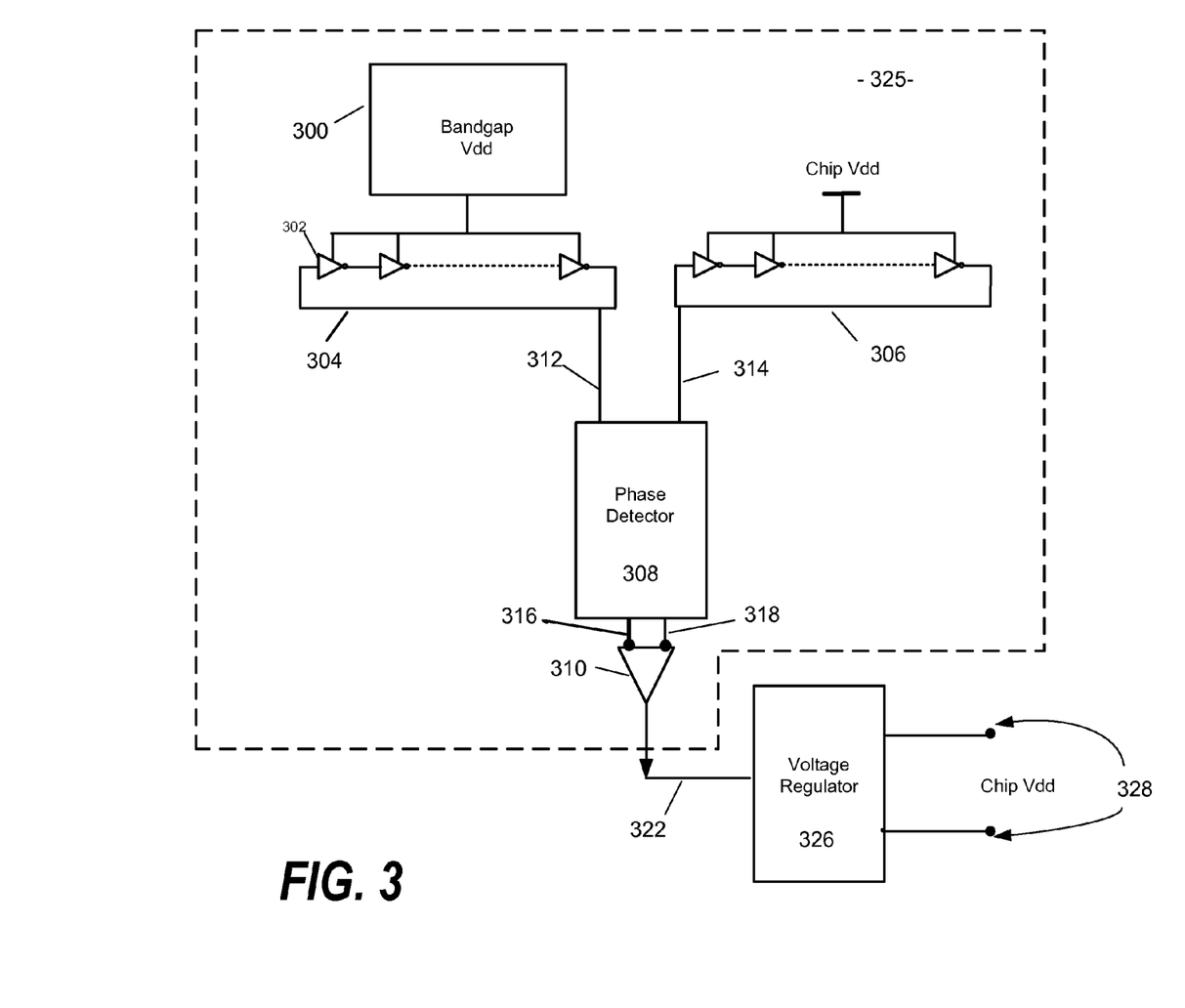
FIG. 3 is a schematic diagram of the two ring oscillator circuit that provides input for the frequency response measurement and provides the IR drop measurement.

FIG. 3 is a schematic diagram of the IR drop (or voltage drop) measurement circuit 325 which provides voltage scaling signal to a voltage regulator circuit 326. A band gap voltage source 300 is connected to a ring oscillator circuit 304. The ring oscillator circuit 304 consists of an odd number of inverters 302 connected in a loop or ring. The band gap source is obtained from the physical integrated circuit itself and is nominally 1.23 V. A second ring oscillator circuit 306 connected to the chip voltage source provides an output on line 314. The band gap ring oscillator provides an output on line 312. A phase detector 308 is connected to lines 312 and 314 to determine the difference or delay between the pulses provided by the two ring oscillator circuits 304 and 306. The phase detector 308 provides a voltage magnitude output and a voltage polarity output on lines 316 and 318 respectively which in combination represent the delay difference between the ring oscillator circuits 304 and 306. Lines 316 and 318 are input to a comparator 310 which provides a voltage scaling signal on line 322 to the voltage regulator 326. It should be understood that this voltage scaling signal on line 322 is based solely upon the IR drop of the integrated circuit. Based on the voltage scaling signal of line 322, voltage regulator 326 provides the appropriate chip Vdd value. In the preferred embodiment, the two ring oscillator circuits 304 and 306 should be located in close proximity to each other so that the effects of any irregularities across the surface of the integrated circuit will be minimized.

The frequency response of the integrated circuit (or performance of the integrated circuit) can be measured by using the output of a band gap voltage connected ring oscillator 304 on line 305 of FIG. 3 and the lookup table containing known delay values based on chip temperature from circuit 226 of FIG. 2. This is illustrated in combination with the IR drop measurement of circuit 325 and the temperature measurement of circuit 225 in FIG. 4. In the IR drop measurement circuit 325, the band gap connected ring oscillator 304 provides a second signal connected to an integrator circuit 414, which takes the pulse signal from the band gap connected ring oscillator 304 of circuit 325 and converts it into a voltage which is then provided to difference circuit 416. Another input line 415 to the difference circuit 416 is compared to the delay voltage signal output from the D to A converter 230 representing the expected delay based on the measured temperature. The output of this difference circuit 416 represents a voltage indicative of the integrated circuit frequency response or performance of the integrated circuit. More specifically, this signal provided to multiplexer 418 represents the actual integrated circuit performance compared to the expected integrated circuit performance for that temperature. If the expected delay signal on line 415 is less than the delay signal from integrator circuit 414, the chip is performing below expectations and the voltage Vdd should be increased. Conversely, if the expected delay on line 415 is greater than the delay signal from integrator circuit 414, the chip is performing above expectations and the voltage Vdd could be lowered to save power.

Figure 4:
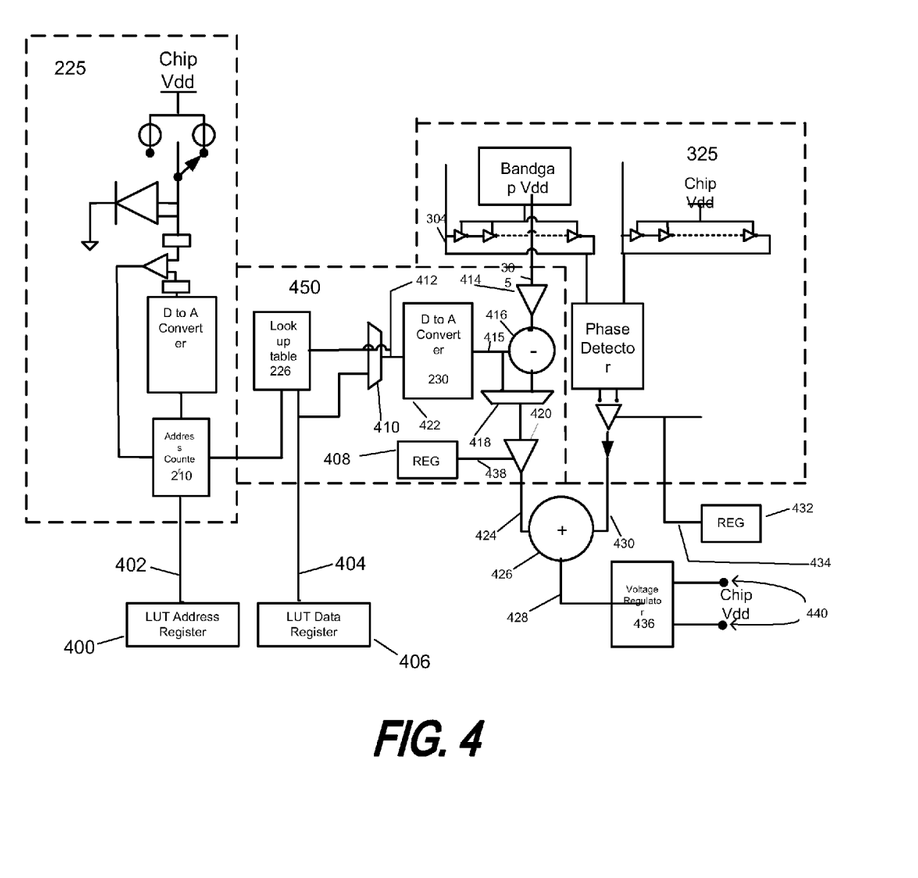
FIG. 4 is a schematic diagram of the preferred embodiment of the adaptive voltage compensation circuit.

FIG. 4 also illustrates the preferred embodiment of the invention combining the temperature measurement circuit 325 output, the IR drop measurement circuit 325 output with the frequency response measurement as discussed above. In this embodiment, the temperature measurement circuit includes a lookup table address register 400 connected to the address counter 210 by line 402 to provide an initial address or to provide an artificially changed temperature that would result in an artificially changed voltage scaling signal. Also, the lookup table data register 406 is provided that may provide a directed input into the delay lookup table 226 shown in block 450 where block 450 also contains other circuit elements for frequency response measurement. This can be used to provide entries into the delay lookup table or provide bypass data output directly to multiplexer 410 which is input to the D to A converter 230. In this manner, a programmer could directly control the delay value, which is used to compute the voltage scaling signal on line 428. The output of the D to A converter 230 is provided on line 415 directly to the difference circuit 416 and to the multiplexer 418. In this manner the multiplexer 418 may bypass the difference circuit 416 and only provide the temperature dependant table delay value to the driver 420. The driver 420 is connected to a register 408 by line 438 which can be used to control the amount of signal output on line 424 to the summing circuit 426. Likewise, in circuit 325, register 432 provides on line 434, a signal that can be used to vary the amount of the scaling signal output from the circuit 325 to the summing circuit 426. The output from summing circuit 426 is the voltage scaling signal on line 428 and is provided to the voltage regulator 436 which in turn provides the integrated circuit voltage (chip Vdd) 440.

Figure 5:
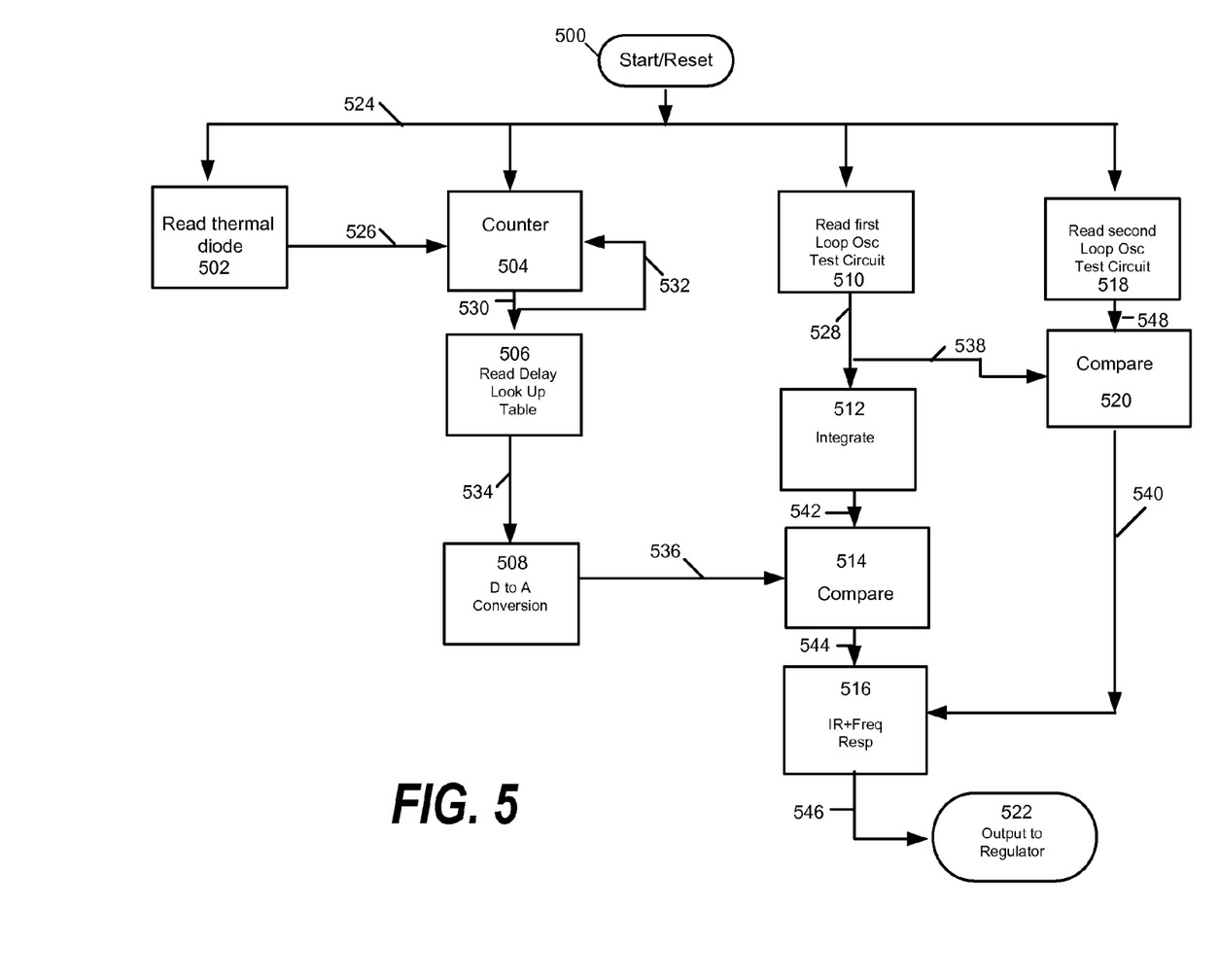
FIG. 5 is a flow chart representing the operation of the adaptive voltage compensation circuit.

FIG. 5 is a process flow chart representing the operation of the invention. It is important understand, that FIG. 5 is not a flow chart representing software execution but of a simultaneous process producing the voltage scaling signal previously discussed in the operation of the different functional units of the present invention. The discussion of this flowchart of FIG. 5 will also reference FIGS. 2, 3 and 4 respectively. In the start phase 500, path 524 illustrates the simultaneous operation of the different aspects of this invention. In step 502, the thermal diode 208 provides an output voltage indicating the measured circuit temperature on line 506 to process block 504. Process block 504 represents the operation of the address counter 222, the D to A converter 218 and the voltage comparator 212 (of FIG. 2) in determining a digital signal representative of the circuit temperature as previously discussed. Referring to FIG. 5, this digital temperature is provided on path 530 to the delay lookup table in step 506 which provides a digital signal representative of the delay on path 534 to the D to A conversion step 508 resulting in the delay signal voltage provided to the comparator 514 over path 536.

Returning to path 524, the frequency response value measured in block 510 is provided in path 528 to both the integration block 512 and to the compare block 520 by line 538 as discussed in FIG. 4. The integration circuit 414 of FIG. 4 provides the frequency response measurement signal to the compare block 514 over path 542 which is then compared to the delay signal on path 536. This result of this comparison is provided on path 544. Returning to path 524, the measurement of the IR drop from the ring oscillator 306 connected to the chip voltage supply is compared with the ring oscillator 304 connected to the band gap voltage source in step 520. The output on path 540 represents the IR drop portion of the voltage scaling signal and is combined in step 516 to produce the overall voltage scaling signal 546 provided to the regulator 436 in step 522. It is important understand that this voltage scaling signal results from the combination of the measurements for temperature, IR drop and circuit frequency response.

While this discussed embodiment shows only a single voltage control circuit on the integrated circuit, it should be apparent that multiple voltage control circuits may be utilized to provide different voltages to different portions of the integrated circuit.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for regulating voltage supplied from a voltage source to a circuit comprising the steps of:

receiving a first frequency signal from a first ring oscillator connected to a bandgap voltage source, receiving a second frequency signal from a second ring oscillator located in close proximity to the first ring oscillator and connected to a circuit voltage source, combining the first and second frequency signals to form a voltage scaling signal, and providing the voltage scaling signal to the circuit voltage source.

2. A method according to claim 1 further comprising the steps of:

receiving a first voltage from a thermal diode on the circuit;

addressing a table of digital temperature representations by incrementing an address every cycle of a circuit clock, converting the addressed data to a second voltage representing the addressed temperature, comparing the first voltage with the second voltage, providing a signal when both the first and second voltages are equal, and combining a current addressed temperature representation upon occurrence of the signal with the voltage scaling signal to provide an adjusted voltage scaling signal.

3. A method according to claim 2 wherein said step of addressing a table of digital temperature representations includes selectively receiving an input from a programmable register.

4. A method according to claim 2 wherein said step of comparing the first voltage and the second voltage includes the step of substituting the input from the programmable register for the second voltage.

5. A method according to claim 1 wherein said combining step further includes the steps of:

determining a phase difference between the first and second frequency signals, determining a polarity of the combined first and second frequency signals, and combining the phase difference with the polarity to form the voltage scaling signal.

6. An electronic system comprising:

a first ring oscillator connected to a bandgap voltage source, a second ring oscillator connected to a circuit voltage source and located in close proximity to the first ring oscillator, a voltage scaling signal circuit connected to the first and second ring oscillators, and a voltage supply providing power to the electronic system in response to a voltage scaling signal received from the voltage scaling signal circuit wherein the voltage scaling signal results from combing a first ring oscillator signal with a second ring oscillator signal.

7. An electronic system, according to claim 6 wherein said second ring oscillator is located in close proximity to the first ring oscillator and said voltage scaling signal circuit includes a phase detector connected to the first ring oscillator and the second ring oscillator.

8. An electronic system comprising:

a thermal diode, an addressing circuit connected to a system clock, a digital temperature table connected to the addressing circuit, a comparator connected to the digital temperature table and to the thermal diode, a frequency response table connected to the output of the digital temperature table, a first ring oscillator, a second ring oscillator located in close proximity to the first ring oscillator, a first voltage scaling signal circuit connected to the frequency response table and the first ring oscillator, a second voltage scaling signal circuit connected to the first and second ring oscillators, and a voltage supply providing power to the electronic system in response to a first voltage scaling signal received from the first voltage scaling signal circuit and a second voltage scaling signal received from the second voltage scaling signal circuit.

9. An electronic system according to claim 8 further including a first scaling register connected to the first voltage scaling signal circuit and a second scaling register connected to the second voltage scaling signal circuit.

* * * * *